(12) United States Patent
Oda et al.

(10) Patent No.: US 7,204,866 B2
(45) Date of Patent: Apr. 17, 2007

(54) NIOBIUM OR TANTALUM POWDER AND METHOD FOR PRODUCTION THEREOF, AND SOLID ELECTROLYTIC CAPACITOR

(75) Inventors: Yukio Oda, Yokohama (JP); Yujiro Mizusaki, Aizuwakamatsu (JP)

(73) Assignee: Cabot Supermetals K.K., Tokyo (JP)

( * ) Notice: Subject to any disclaimer, the term of this patent is extended or adjusted under 35 U.S.C. 154(b) by 349 days.

(21) Appl. No.: 10/297,083

(22) PCT Filed: May 31, 2001

(86) PCT No.: PCT/JP01/04596

§ 371 (c)(1),
(2), (4) Date: Dec. 2, 2002

(87) PCT Pub. No.: WO01/91953

PCT Pub. Date: Dec. 6, 2001

(65) Prior Publication Data

US 2003/0183042 A1     Oct. 2, 2003

(30) Foreign Application Priority Data

Jun. 1, 2000     (JP) .............................. 2000-165104

(51) Int. Cl.
*B22F 1/00*     (2006.01)
*G01H 9/052*    (2006.01)
(52) U.S. Cl. ..................... 75/252; 75/245; 75/343; 361/529
(58) Field of Classification Search ................ 75/255, 75/245, 343, 252; 361/529
See application file for complete search history.

(56) References Cited

U.S. PATENT DOCUMENTS

| | | | |
|---|---|---|---|
| 6,024,914 A | 2/2000 | Yoshida | |
| 6,051,044 A * | 4/2000 | Fife | 75/229 |
| 6,051,326 A * | 4/2000 | Fife | 428/610 |
| 6,136,062 A | 10/2000 | Löffelholz et al. | 75/369 |
| 6,171,363 B1 | 1/2001 | Shekhter et al. | 75/369 |
| 6,193,779 B1 | 2/2001 | Reichert et al. | 75/343 |
| 6,238,456 B1 | 5/2001 | Wolf et al. | 75/245 |
| 6,479,012 B2 | 11/2002 | Rao | |
| 6,521,013 B1 | 2/2003 | Naito et al. | 75/239 |
| 6,558,447 B1 | 5/2003 | Shekhter et al. | 75/252 |
| 6,563,695 B1 * | 5/2003 | Suzuki et al. | 361/529 |
| 6,576,038 B1 | 6/2003 | Rao | 75/255 |
| 6,679,934 B2 | 1/2004 | Rao et al. | 75/245 |
| 6,696,138 B2 | 2/2004 | Sakai et al. | 428/209 |
| 2002/0108469 A1 * | 8/2002 | Behrens | 75/770 |
| 2003/0115985 A1 | 6/2003 | Rao | |
| 2003/0126944 A1 | 7/2003 | Tripp et al. | 75/244 |
| 2003/0218857 A1 | 11/2003 | Omori et al. | 361/501 |
| 2003/0230167 A1 | 12/2003 | Loeffelholz et al. | 75/255 |
| 2004/0042154 A1 | 3/2004 | Naito et al. | 361/305 |
| 2004/0052013 A1 | 3/2004 | Naito et al. | 361/15 |

FOREIGN PATENT DOCUMENTS

| | | |
|---|---|---|
| DE | 31 30 392 A1 | 2/1983 |
| DE | 198 55 998 A1 | 9/1999 |
| DE | 198 31 280 A1 | 1/2000 |
| JP | 55-128816 | 10/1980 |
| JP | 62-268125 | 11/1987 |
| JP | 2-34701 | 2/1990 |
| JP | 5-275293 | 10/1993 |
| JP | 6-252011 | 9/1994 |
| JP | 08-031700 | 2/1996 |
| JP | 8-31700 | 2/1996 |
| JP | 9-74051 | 3/1997 |
| JP | 11-181505 | 7/1999 |
| JP | 11-224833 | 8/1999 |
| WO | WO 98/37248 | 8/1999 |
| WO | WO 99/61184 | 12/1999 |
| WO | WO 00/67936 | 11/2000 |

OTHER PUBLICATIONS

The Riverside Publishing company, Webster's II New Riverside University Dictionary. 1984.*
International Search Report for PCT/JP01/04596 dated Sep. 4, 2001.
International Preliminary Examination Report for PCT/JP01/04596 dated Sep. 17, 2002.
Written Opinion for PCT/JP01/04596 dated Mar. 12, 2002.
Communication from the European Patent Office for EP 01934455.5 dated Mar. 18, 2004, containing Supplementary European Search Report.
Document D2—Product Data Sheet from H.C. Starck for STA-18KT and STA-20KN Capacitor Grade Tantalum Powder, Oct. 1999.
Document D3—Product Data Sheet from H.C. Starck for STA-40KD Capacitor Grade Tantalum Powder, Oct. 1999.
Document D6—Amosov et al., "Production of Porous Tantalum Anodes of Electrolytic Condensers," POROSHKOVAYA METALLURGICA, No. 1, (109), Jan. 1972, pp. 53-59 (English translation attached pp. 42-46).
Document D8— Experimental Report 1 (with English translation attached).
Document D9—Experimental Report 2 (with English translation attached).
Document D10—Experimental Report 3 (with English translation attached).

* cited by examiner

*Primary Examiner*—Ngoclan T. Mai
(74) *Attorney, Agent, or Firm*—Kilyk & Bowersox, P.L.L.C.

(57) ABSTRACT

A niobium or tantalum powder of the present invention comprises aggregates in which primary particles of niobium or tantalum are aggregated, and have a pore distribution having a peak in the range from 1 to 20 μm as measured by mercury porosimetry. That is, the niobium or tantalum powder of the present invention comprises aggregates having large pores, which connect with vacancies between the primary particles and facilitate the permeation of an electrolyte over the entirety of the inside of each aggregate. Accordingly, a solid electrolytic capacitor comprising an anode electrode made of the niobium or tantalum powder has high capacity and also a low ESR.

19 Claims, 1 Drawing Sheet

NIOBIUM OR TANTALUM POWDER AND METHOD FOR PRODUCTION THEREOF, AND SOLID ELECTROLYTIC CAPACITOR

TECHNICAL FIELD

The present invention relates to a niobium or tantalum powder which is suitable for preparing an anode electrode for a solid electrolytic capacitor, production method thereof, and a solid electrolytic capacitor.

This application is based on Patent Application No. 2000-165104 filed in Japan, the contents of which are incorporated herein by reference.

BACKGROUND ART

Recently, there is demand for an electronic integrated circuit which can be driven with a low voltage, with high frequency, and reduced noise. Therefore, there is also demand for a solid electrolytic capacitor having a low ESR (equivalent series resistance), and a low ESL.

In order to produce an anode electrode which is made of niobium or tantalum and used for a solid electrolytic capacitor, a dielectric oxide film is formed on a sintered body which is prepared by pressing aggregates having a size in a range from 40 to 100 μm so that about 70% by volume of pores remain which is relative to 100% by volume of pores before pressing and sintering. In order to produce these aggregates, first, primary particles of niobium or tantalum are heat aggregated by, for example, a method in which potassium fluorides are deoxidized using an oxygen scavenger, such as magnesium.

Recently, in order to increase the capacity of the capacitor, primary particles of niobium or tantalum have been made finer.

When the primary particles becomes finer, pores of a molded product or sintered body made of such primary particles becomes finer. As a result, an electrolyte solution cannot sufficiently permeate over the entirety of the inside of the primary particles, and a problem causes that the ESR cannot be reduced. At the present time, the pore diameter of a practical sintered anode electrode which is made of niobium or tantalum and has about 50,000 CV is about 0.4 μm. In order to increase the capacity and lower the ESR, it is essential to solve the problem of insufficient permeation of an electrolyte solution due to fineness of the pore.

Several methods for improving the permeability of an electrolyte solution into a sintered anode electrode have been suggested.

For example, Unexamined Japanese Patent Application, First Publication No. Hei 09-74051 discloses a method in which a mixture in which polymers having a string shape are added and mixed to aggregates of tantalum and the like is molded and sintered, and thereby micro pores are formed in the sintered body.

Unexamined Japanese Patent Application, First Publication No. Hei 06-252011 discloses a method in which in order to shorten paths of pores, a thin sintered body is prepared and then a layer is formed of plurality of the thin sintered bodies. According to the method, it is possible to improve permeability of manganese nitrate into sintered body.

In addition, a method has also been suggested in which large pores remain by reducing the pressure applied to form a molded product.

However, the method disclosed in Unexamined Japanese Patent Application, First Publication No. Hei 09-74051 provides a sintered body having pores between a plurality of aggregates, and cannot provide a sintered body in which each aggregate comprises pores. Therefore, permeation of an electrolyte into the pores between a plurality of aggregates may be improved; however, permeation of an electrolyte inside of each aggregate is not improved. In addition, since carbon generated from added polymers remains inside of the aggregates, this causes adverse effects on the capacitor properties.

The method disclosed in Unexamined Japanese Patent Application, First Publication No. Hei 06-252011 has the problem that a number of required processes increases.

In the method in which large pores remain by reducing the pressure applied to form a molded product, there is a problem that the adhesive strength between an electrode wire and a molded product which are used for an anode electrode decreases.

DISCLOSURE OF THE INVENTION

Therefore, one object of the present invention is to provide a solid electrolytic capacitor having a high capacity and a low ESR by forming large pores in each aggregate of niobium or tantalum comprising a sintered anode electrode having a high capacity, such as exceeding 50,000 CV, and thereby the permeability of an electrolyte is improved.

A niobium or tantalum powder of the present invention comprises aggregates in which primary particles of niobium or tantalum are aggregated, and has a pore distribution having a peak in the range from 1 to 20 μm as measured by mercury porosimetry.

A production method of a niobium or tantalum powder of the present invention comprises the steps of: adding pore forming material having a thermal decomposition property or a thermal sublimation property and at least one shape selected from particle shape, film shape, foil shape, flake shape, and fiber shape to primary particles of niobium or tantalum; and heat treating and thereby removing the pore forming material and forming aggregates.

Another production method of a niobium or tantalum powder of the present invention comprises the steps of: adding pore forming material having an acid solubility and at least one shape selected from particle shape, film shape, foil shape, flake shape, and fiber shape to primary particles of niobium or tantalum; and heat treating and acid treating and thereby removing the pore forming material and forming aggregates.

BEST MODE FOR CARRYING OUT THE INVENTION

A detailed description of a niobium or tantalum powder according to the present invention will be given below.

A niobium or tantalum powder of the present invention comprises aggregates in which primary particles of niobium or tantalum are aggregated. The primary particles of niobium or tantalum are prepared by, for example, deoxidizing niobium compounds or tantalum compounds.

The niobium compounds or tantalum compounds used in the present invention are not specifically limited, but include metallic compounds. Among metallic compounds, potassium fluorides and halogenides are preferable. More specifically, potassium fluorides include $K_2TaF_7$, $K_2NbF_7$, $K_2NbF_6$, and the like. Halogenides include chlorides such as niobium pentachlorides, lower niobium chlorides, tantalum pentachlorides, and lower tantalum chlorides; iodides; bromides; and the like. In addition, niobium compounds include fluoroniobates such as potassium fluoroniobates, and oxides such as niobium pentaoxides and the like.

A deoxidizer used to deoxidize niobium compounds or tantalum compounds include alkaline metals and alkaline earth metals such as sodium, magnesium, and calcium; hydrides thereof such as magnesium hydrides, and calcium hydrides; deoxidizing gases such as gas containing hydrogen; and the like.

The primary particles of niobium or tantalum are generally prepared by deoxidizing the above niobium compounds or tantalum compounds at 800–900° C. in molten salts such as a eutectic mixture of KCl—KF, KCl—NaCl, and the like.

The niobium or tantalum powder may contain nitrogen at 50 to 10,000 ppm. When the niobium or tantalum powder contains nitrogen at 50 to 10,000 ppm, the sinter shrinkage percentage of the niobium or tantalum powder at high temperatures decreases. As a result, a capacity of a capacitor provided with an anode electrode made from the sintered body increases. In addition, leakage current decreases, and a capacitor having high reliability can be prepared.

In addition, the niobium or tantalum powder may contain at least one of phosphorus and boron. The content of phosphorus and boron is preferably in a range from 10 to 500 ppm. When before aggregation of the primary particles of niobium or tantalum, phosphorus and/or boron is added and the primary particles of niobium or tantalum are heat aggregated in the presence of phosphorus and/or boron, it is possible to prevent the surface area of the niobium or tantalum powder from decreasing.

Figure 1:
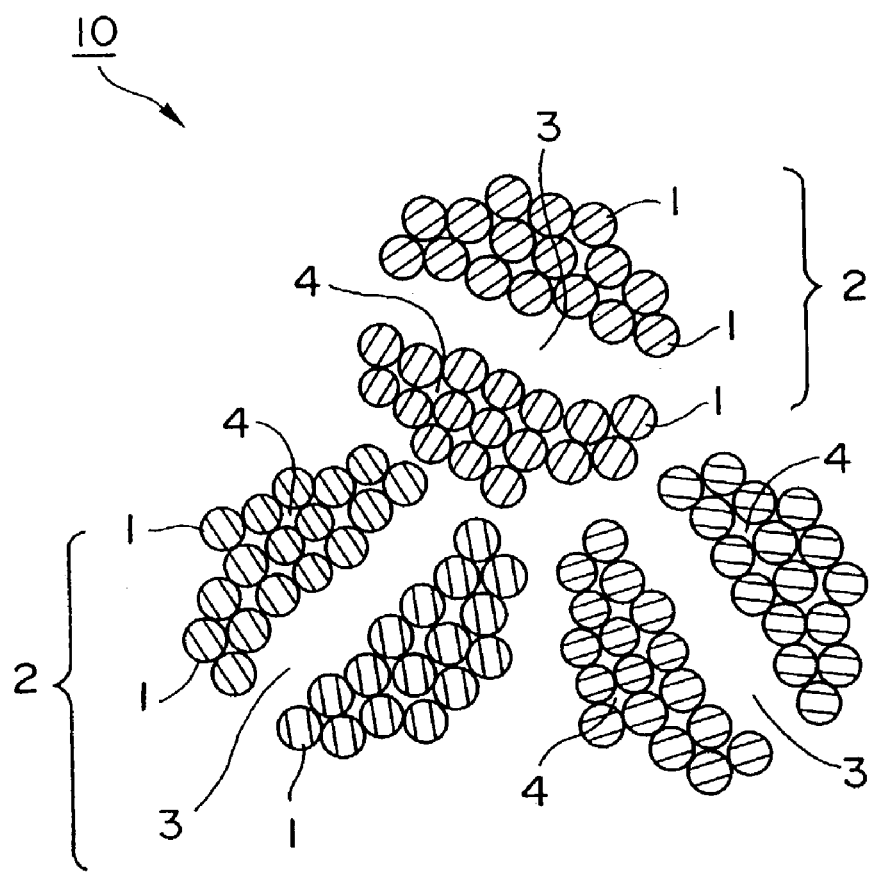
FIG. 1 is a cross-sectional view showing schematically a niobium or tantalum powder of the present invention.

FIG. 1 is a cross-sectional view showing schematically the niobium or tantalum powder 10 of the present invention.

The niobium or tantalum powder 10 is a powder comprising aggregates 2 in which the primary particles 1 of niobium or tantalum are aggregated. Each aggregate 2 comprises a pore 3. When a pore distribution of the aggregate 2 is measured by mercury porosimetry, there is a peak in a range from 1 to 20 μm. Also, three aggregates 2 are shown in FIG. 1.

Figure 2:
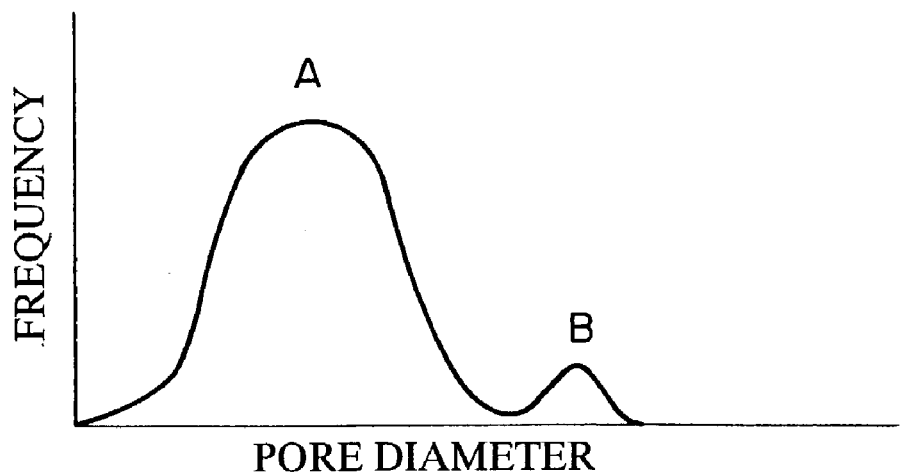
FIG. 2 is a graph showing schematically a pore distribution as measured by mercury porosimetry of a niobium or tantalum powder of the present invention.

In the aggregate 2 in which the primary particles 1 of niobium or tantalum are aggregated, there are vacancies 4 between the primary particles 1. The size of the vacancies 4 measured by mercury porosimetry is generally in a range from 0.05 to 2 μm. The model size of the vacancies 4, namely, the peak in the vacancy distribution exists in a range from 0.05 to 0.3 μm. In contrast, when the pore distribution of the niobium or tantalum powder of the present invention is measured by mercury porosimetry, a peak in a range from 1 to 20 μm can be confirmed. This peak is not due to the vacancies 4 between the primary particles 1, and is due to the pores 3 formed intentionally by the following method, for example. Therefore, when the pore distribution of the niobium or tantalum powder of the present invention is measured by mercury porosimetry, as shown schematically in FIG. 2, the peak A due to the vacancies 4 between the primary particles 1 and the peak B due to the pores 3 in the aggregates 2 are confirmed.

The particle diameter of the aggregates 2 is generally in a range from about 38 to 250 μm. The average particle diameter of the primary particles 1 by the BET method is generally in a range from 80 to 500 nm.

The niobium or tantalum powder of the present invention can be produced by the following method.

To the primary particles of niobium or tantalum which are obtained by deoxidizing the niobium compounds or the tantalum compounds, a pore forming material is added.

The pore forming material used in the present invention has a thermal decomposition property, a thermal sublimation property or an acid solubility. In other words, the pore forming material is decomposed or sublimated by heat, or dissolved in acids by acid treatment such as acid cleaning. Therefore, the pore forming material is easily removed by the subsequent process, such as heat treatment, and acid treatment. When the pore forming material is removed, the space at which the pore forming material exists becomes a pore. When the pore distribution of the obtained powder is measured by mercury porosimetry, it is confirmed that the peak is in a range from 1 to 20 μm.

It is preferable that the shape of the pore forming material be at least one selected from particle shape, film shape, foil shape, flake shape, and fiber shape. In addition, among these pore forming materials, a pore forming material having a particle shape and a particle size in a range from 2 to 6 μm, and a pore forming material having a film or foil shape, a thickness in a range from 1 to 20 μm, and a length in a range from 100 μm to 1 cm, are preferable. Furthermore, among the pore forming materials having a film or foil shape and a thickness in a range from 1 to 20 μm, the pore forming material that is substantial circular and having a diameter of 100 μm or greater is preferable.

When a such pore forming material is used, it is possible to effectively form a pore which has an opening at the surface of the aggregate, or a hole which passes through the aggregate.

In order to make the primary particles of niobium or tantalum be secondary particles having a relative large size, the powder mixture is heated and thereby heat aggregated.

In general, a heat aggregation is performed by heating the powder mixture in a vacuum at 800 to 1,400° C., for 0.5 to 2 hours. When the pore forming material having a thermal decomposition property is used, the pore forming material is heat decomposed and removed in this heat aggregation process. As a result, the spaces where the pore forming material is present become the pores.

Before the heat aggregation, it is preferable to perform a pre-aggregation in which an amount of water such that the whole powder is uniformly wet is added while the powder is vibrated. Due to the pre-aggregation, firmer aggregates can be obtained. If about 10 to 500 ppm of phosphorous, boron, and the like are added to water used in the pre-aggregation, it is possible to prevent a fusion growth of the primary particles and to heat aggregate the primary particles while maintaining a large surface area. For example, phosphoric acid, phosphorous ammonium hexafluoride, and the like is used for the phosphorous.

After that, the powder in a cake state obtained by the heat aggregation is crushed in air or inert gas, then deoxidizer such as magnesium is added and thereby the deoxidizer reacts with oxygen in the powders and oxygen in the particles is removed.

The deoxidation is performed for 1 to 3 hours in an inert gas atmosphere, such as argon, at a temperature from the melting point to the boiling point of the deoxidizer. After that, a slow oxidation and stabilization treatment is performed by introducing air into the inert gas such as argon during cooling. Then an acid treatment is performed and thereby substances remain in the powders such as magnesium, magnesium oxides, and the like, which are generated due to the deoxidizer are removed.

When the pore forming material used in the former process has an acid solubility, the pore forming material is dissolved in the acid solution and removed in this acid treatment. As a result, the spaces where the pore forming material is present become the pores.

The pore forming material include polymers having a thermal decomposition property or organic materials having a thermal sublimation property, such as camphor ($C_{10}H_{16}O$), naphthalene ($C_{10}H_8$), benzoic acid ($C_7H_6O$), and the like. The pore forming material having an acid solubility includes metals and metal compounds which easily dissolve in acids, such as magnesium, magnesium hydrides, calcium, calcium hydrides, aluminum, and the like. These pore forming materials having an acid solubility function as a deoxidizer as well as a pore forming material. Therefore, if the pore forming material having an acid solubility is used as the pore forming material, it is not necessary to add again the deoxidizer at the deoxidization process after the heat aggregation process. In addition, there is no limitation to the adding amount of the pore forming material; however, in general, 3% by volume of the pore forming material relative to niobium or tantalum is added, and preferably 3 to 20% by volume is added.

The niobium or tantalum powder comprising aggregates in which the primary particles of niobium or tantalum are aggregated and having a pore distribution peak measured by mercury porosimetry in a range from 1 to 20 μm is produced by the method comprising the above processes.

When about 3 to 5% by weight of camphor as a binder, for example, is added to the niobium or tantalum powder and press molded, a niobium or tantalum porous molded product is produced, which has a pore ratio of 60% by volume or greater; which has pore distribution peaks measured by mercury porosimetry being respectively in a range from 0.08 to 0.5 μm and a range from 1 to 20 μm; and which comprise 5% by volume or greater of the pore having a size in a range from 1 to 20 μm relative to the total pore volume. When the pore distribution is measured, the mold density is set in a range from 4.5 to 5.0 g/cm$^3$. Since the niobium or tantalum powder according to the present invention comprises aggregates each of which has a large pore area, namely, a large pore ratio relative to the total surface area, the contacting area between a die and the surface of the aggregates in the press molding process decreases. In other words, friction between the die and the aggregates decreases. As a result, it is possible to prevent the spaces between the aggregates from being reduced and occluded.

When the niobium or tantalum porous molded product is heated and sintered at 1,000 to 1,400° C. for about 0.3 to 1 hour, a niobium or tantalum porous sintered body which comprises 5% by volume or greater of the pore having a size in a range from 1 to 20 μm relative to the total pore volume is produced. Moreover, the sinter temperature can be adjusted depending on kind of metal, surface area of the powder, and the like.

When the niobium or tantalum porous sintered body is used as an anode electrode, before press molding the niobium or tantalum powder, a lead wire is embedded in the powder, press molded, and sintered, and thereby the lead wire is integrated. After that, when the obtained product is subjected to formation and oxidation treatment, for example, under conditions in which the temperature is in a range from 30 to 90° C., in an electrolyte solution containing about 0.1% by weight of phosphoric acid, nitrous acid, or the like, the current density is in a range from 40 to 80 mA/g, the voltage gradually increases from 20 to 60 V, the treatment period is 1 to 3 hours, and thereby an porous sintered body for an anode electrode is produced.

In practice, onto the porous sintered body, an solid electrolyte layer made of manganese dioxide, lead oxide, conductive polymers, and the like, a graphite layer, and a silver paste layer are formed in sequence by well-known methods, and after that, a negative terminal is connected to the surface of the layered product by soldering and other methods, a resin cover is formed, and thereby an anode electrode for a solid electrolytic capacitor is produced.

The niobium or tantalum powder used for an anode electrode for a solid electrolytic capacitor comprises aggregates in which primary particles of niobium or tantalum are aggregated, and has a pore distribution having a peak in the range from 1 to 20 μm as measured by mercury porosimetry. That is, each aggregate comprises a large pore. The large pore and the vacancies formed between the primary particles are connected. Therefore, when the niobium or tantalum powder of the present invention is used for an anode electrode, since an electrolyte permeates easily over the entirety of the inside of each aggregate, a solid electrolytic capacitor having a high capacity and a low ESR can be produced.

In addition, the niobium or tantalum powder is produced by the method comprising the steps of: adding pore forming material having a thermal decomposition property and at least one selected from particle shape, film shape, foil shape, flake shape, and fiber shape to primary particles of niobium or tantalum; and heat treating and thereby removing the pore forming material and forming aggregates. Furthermore, the niobium or tantalum powder is also produced by the method comprising the steps of: adding pore forming material having an acid solubility and at least one shape selected from particle shape, film shape, foil shape, flake shape, and fiber shape to primary particles of niobium or tantalum; and heat treating and acid treating and thereby removing the pore forming material and forming aggregates. The heat treatment and acid treatment of these production methods are the same as those of an ordinary production method of aggregates. Therefore, the production method of the present invention does not require a special process, and has excellent productivity.

EXAMPLE

Below, the present invention will be further explained referring to examples.

Example 1

To a 50 liter reaction vessel, 15 kg of each potassium fluoride and potassium chloride as diluent salts were added and the temperature was raised to 850° C., and thereby the diluent salts were melted. The cycle was repeated 30 times, which comprise the steps of adding 200 g of tantalum potassium fluorides to the molten diluent salts, after leaving for 1 minute, adding 58 g of dissolved sodium, and reacting for 2 minutes.

After deoxidization reaction was completed, the product was cooled, the produced lump was crushed, cleaned with an acidulous aqueous solution, and thereby the tantalum powder was obtained. In addition, the tantalum powder was purified with a clearing solvent containing hydrogen fluorides and hydrogen peroxide. The yield of the deoxidized tantalum powder was 1.6 kg.

The produced tantalum powder has the following properties.

BET specific surface area: 1.8 m²/g
Average particle diameter of primary particles: 200 nm
Apparent average particle diameter: 10 μm ($D_{50\%}$)

Next, 35 ml of water was added to 100 g of the deoxidized tantalum powder, then subjected to a mill treatment using a beads mill (zirconia beads having a diameter of 1 mm), crushed until the average particle diameter was about 2 μm, cleaned, filtered, and thereby a wet cake made of tantalum was obtained. After that, 15 ml of an emulsion of camphor (concentration: 10% by weight, emulsion particle diameter: about 5 μm) was added to the wet cake made of tantalum, and prepared a slurry. Then the slurry was dried using a spray dryer, and thereby the tantalum powder having a particle shape and an average particle diameter of about 80 μm was obtained.

Since the tantalum powder having a particle shape had a weak cohesion, the powder was heated in a vacuum heating furnace at 1,100° C. for 1 hour, thereby camphor was removed, and firm aggregates were obtained.

Then, magnesium chips were added to the aggregates, and deoxidized in a furnace at 800° C. After stabilization treatment (slow oxidation treatment), the obtained powder was taken out from the furnace.

When a pore distribution of the powder comprising aggregates was measured by mercury porosimetry, peaks at 0.15 μm and 2.5 μm were observed.

After that, a molded product was obtained by pressing the obtained powder such that the mold density was 5 g/cm³. When a pore distribution of the molded product was measured by mercury porosimetry, peaks at 0.1 μm and the vicinity of 2 μm were observed. The pore ratio thereof was about 70% by volume. The pores having a pore size in a range from 1 to 20 μm occupy 7% by volume relative to the total pore volume.

Example 2

The deoxidized tantalum powder was obtained in the same manner as in the Example 1. 100 g of the deoxidized tantalum powder was crushed using a beads mill in dehydrated alcohol. After that, 3 g of magnesium hydride particles having a diameter of 7 μm and 20 mg of phosphorous aluminum hexafluorides were added, mixed, dried in a vacuum drier at 50° C., and thereby a solid containing no alcohol component was obtained. The added amount of magnesium hydrides relative to the deoxidized tantalum powder was about 20% by volume. The obtained solid was further heated in a vacuum heating furnace at 800° C. for 1 hour and at 1,200° C. for 0.5 hours. By these process, oxygen at the surface of the tantalum powder was removed (deoxidized) and the tantalum powder was heat aggregated.

Then, the aggregates were crushed in an inert gas atmosphere and the particle size thereof was adjusted to about 100 μm. After washing with a mixed acid containing nitric acid and hydrogen peroxide, and thereby magnesium oxides formed in the previous process and magnesium residue were dissolved and removed. After that, the powder was obtained by washing with pure water and dried in a vacuum drier.

When a pore distribution of the powder comprising aggregates was measured by mercury porosimetry, peaks at 0.20 μm and 2.5 μm were observed.

After that, a molded product was obtained by pressing the obtained powder such that the mold density was 4.5 g/cm³. When a pore distribution of the molded product was measured by mercury porosimetry, peaks at 0.15 μm and the vicinity of 1.5 μm were observed. The pore ratio thereof was about 73% by volume. The pores having a pore size in a range from 1 to 20 μm occupy 8% by volume relative to the total pore volume.

Example 3

The deoxidized tantalum powder was obtained in the same manner as in the Example 1. After that, 2 g of magnesium metal having a fiber shape and a diameter of about 8 μm and a length of 100 to 300 μm was added to 100 g of the deoxidized tantalum powder, and mixed sufficiently, then a small amount of phosphoric acid solution was gradually added while vibrating, and thereby a solid in a lump was obtained. The added amount of magnesium metal relative to the deoxidized tantalum powder was 14% by volume. The water component required for the deoxidized tantalum powder to be a lump was 22 ml, and the content of phosphoric acid relative to the deoxidized tantalum powder was 150 ppm.

The obtained solid was heated in a vacuum heating furnace to 850° C., the conditions were maintained for 1 hour, and after that, the temperature was raised to 1,150° C. and the conditions were maintained for 0.5 hours. Then, by flowing argon gas into the furnace, the tantalum metal was subjected to an oxidization and stabilization treatment.

The solid was taken out from the furnace, crushed roughly in an argon flow by a roll crusher, further crushed by a pin-disc mill and a super micron mill, and thereby aggregates having a size of 150 μm or less were obtained. The obtained powder was washed with a mixed acid containing hydrochloric acid, nitric acid, and hydrogen fluoride, and thereby magnesium oxides formed in the previous process and magnesium residue were dissolved and removed. After that, the powder was washed with pure water and dried.

When a pore distribution of the powder comprising aggregates was measured by mercury porosimetry, peaks at 0.15 μm and 2.8 μm were observed.

After that, a molded product was obtained by pressing the obtained powder such that the mold density was 5.0 g/cm³. When a pore distribution of the molded product was measured by mercury porosimetry, peaks at 0.2 μm and 2.5 μm were observed. The pore ratio thereof was about 70% by volume. The pores having a pore size in a range from 1 to 20 μm occupy 9% by volume relative to the total pore volume.

Comparative Example 1

Comparative aggregates were produced in a manner identical to that of Example 1, except that camphor was not added.

When a pore distribution of the powder comprising aggregates was measured by mercury porosimetry, peaks at 0.15 μm and 0.95 μm were observed.

After that, a comparative molded product was produced in a manner identical to that of Example 1. When a pore distribution of the molded product was measured by mercury porosimetry, a peak was observed at 0.1 μm and a very weak peak was observed at the vicinity of 0.8 μm. The pore ratio thereof was about 70% by volume. The pores having a pore size in a range from 1 to 20 μm occupy 1% or less by volume relative to the total pore volume.

Comparative Example 2

Comparative aggregates were produced in a manner identical to that of Example 2, except that the solid was obtained by heat aggregating without magnesium hydrides, after that by adding the same amount of magnesium hydrides in the Example 2, and deoxidization treating at 800° C. for 2 hours. When a pore distribution of the powder comprising aggregates was measured by mercury porosimetry, peaks at 0.18 μm and 0.9 μm were observed.

After that, a comparative molded product was produced in a manner identical to that of Example 2. When a pore distribution of the molded product was measured by mercury porosimetry, a peak was observed at 0.15 μm and a weak peak was observed at the vicinity of 0.8 μm. The pore ratio thereof was about 70% by volume. The pores having a pore size in a range from 1 to 20 μm occupy 1% by volume or less relative to the total pore volume.

Comparative Example 3

Comparative aggregates were produced in a manner identical to that of Example 3, except that a solid was obtained by heat aggregating without magnesium metal in a fiber shape, after that adjusting the particle size to 150 μm or less, adding 8% by volume of magnesium chips, and deoxidization treating at 850° C. for 2 hours. When a pore distribution of the powder comprising aggregates was measured by mercury porosimetry, peaks at 0.18 μm and 0.95 μm were observed.

After that, a comparative molded product was produced in a manner identical to that of Example 3. When a pore distribution of the molded product was measured by mercury porosimetry, a sharp peak was observed at 0.1 μm and a very weak peak was observed at the vicinity of 0.8 μm.

Example 4

A molded product was produced by press molding 15 mg of the mixture in which 3% by weight of camphor was added as a binder to the aggregates obtained in the Example 1, such that the mold density was 5.0 g/cm$^3$.

The sintered body was produced by sintering the molded product at a temperature such that the sinter density was in a range from 5.5 to 5.6 g/cm$^3$ for 20 minutes.

The sintered body was subjected to formation and oxidation treatment under conditions in that in an electrolyte solution containing 0.1% by weight of phosphoric acid at 60° C., the current density was 60 mA/g, the voltage gradually increased to 30 V, and the treatment period was 120 minutes.

In addition, manganese nitrate aqueous solutions having concentrations of 25%, 50%, 62%, and 76% were made to penetrate in the sintered body twice per 1 kind of aqueous solution from the aqueous solution having the lowest concentration, that is, a total of 8 times. After that, the sintered body was pre-heated in a steam atmosphere at 105° C. for 15 minutes, and baked at 220° C. for 15 minutes.

The CV value and the ESR of the capacitor pellet thus obtained were measured. Moreover, the conditions for measuring the ESR were 100 kHz, 1.5 VDC, and 0.5 Vrms. The results are shown in Table 1.

Example 5

A capacitor pellet was produced in a manner identical to that of Example 4, except that the aggregates obtained in the Example 2 were used. Then, the properties of the capacitor pellet were measured. The results are shown in Table 1.

Example 6

A capacitor pellet was produced in a manner identical to that of Example 4, except that the aggregates obtained in the Example 3 were used. Then, the properties of the capacitor pellet were measured. The results are shown in Table 1.

Comparative Example 4

A comparative capacitor pellet was produced in a manner identical to that of Example 4, except that the aggregates obtained in the Comparative Example 1 were used. Then, the properties of the capacitor pellet were measured. The results are shown in Table 1.

Comparative Example 5

A comparative capacitor pellet was produced in a manner identical to that of Example 4, except that the aggregates obtained in the Comparative Example 2 were used. Then, the properties of the capacitor pellet were measured. The results are shown in Table 1.

Comparative Example 6

A comparative capacitor pellet was produced in a manner identical to that of Example 4, except that the aggregates obtained in the Comparative Example 3 were used. Then, the properties of the capacitor pellet were measured. The results are shown in Table 1.

Comparative Example 7

A comparative capacitor pellet was produced in a manner identical to that of Example 4, except that 3% by weight of methacrylate polymer fiber having a diameter of 10 μm and a length of 30 μm was added and mixed with the aggregates obtained in the Comparative Example 3, and pressed such that the mold density was 5.0 g/cm$^3$. Then, the properties of the capacitor pellet were measured. The results are shown in Table 1.

TABLE 1

|  | CV value (10$^3$ μF · V/g) | ESR (Ω) |
| --- | --- | --- |
| Example 4 | 101 | 0.59 |
| Example 5 | 100 | 0.55 |
| Example 6 | 99 | 0.60 |
| Comparative Example 4 | 95 | 0.98 |
| Comparative Example 5 | 93 | 0.95 |
| Comparative Example 6 | 91 | 0.95 |
| Comparative Example 7 | 90 | 0.98 |

It is clear from Table 1 that the capacitor pellets produced in the Examples 4 to 6 have a high CV value and a low ESR, compared with the capacitor pellets produced in the Comparative Examples 4 to 7.

Moreover, the present invention can be applied to any embodiments other than the above Examples as far as the change of the constitution is within the scope of the present invention. The present invention is not limited to the above embodiments and Examples. In addition, the constitutions of the present invention can be changed as long as the change of the constitution is within the scope of the present invention.

INDUSTRIAL APPLICABILITY

As has been described above, the niobium or tantalum powder of the present invention comprises aggregates having large pores. In each aggregate, the pore and the vacancies between the primary particles are connected. Therefore, an electrolyte easily penetrates over the entirety of the inside of the aggregates. Therefore, a solid electrolytic capacitor comprising an anode electrode made of the niobium or tantalum powder has a high capacity and a low ESR. In addition, the production method of the present invention does not require a special process for forming the pores.

Therefore, according to the present invention, it is possible to produce a solid electrolytic capacitor having a large capacity and a low ESR with a high productivity.

The invention claimed is:

1. A niobium or tantalum powder comprising pore distribution peaks measured by mercury porosimetry in a range from 0.05 to 0.3 μm and a range from 1 to 20 μm.

2. A niobium or tantalum powder according to claim 1, wherein the powder contains nitrogen in a range from 50 to 10,000 ppm.

3. A niobium or tantalum powder according to claim 1, wherein the powder contains at least one of phosphorous and boron, and a content of each phosphorous and boron is in a range from 10 to 500 ppm.

4. The niobium or tantalum powder according to claim 1, wherein said powder is tantalum powder.

5. The niobium or tantalum powder according to claim 1, wherein said powder is niobium powder.

6. A production method of a niobium or tantalum powder comprising the steps of:
    adding a solid pore forming material having a thermal decomposition property or a thermal sublimation property and at least one shape selected from particle shape, film shape, foil shape, flake shape, and fiber shape to primary particles of niobium or tantalum, and which is at least one of a polymer and an organic binder; and
    heat treating and thereby removing the solid pore forming material, and forming aggregates.

7. A production method of a niobium or tantalum powder comprising the steps of:
    adding a solid pore forming material having an acid solubility and at least one shape selected from particle shape having a diameter in a range from 2 to 6 μm, film shape and foil shape having a thickness in a range from 1 to 20 μm, and flake shape and fiber shape having a diameter in a range from 1 to 20 μm and a length in a range from 100 μm to 1 cm to primary particles of niobium or tantalum; and
    heat treating and acid treating and thereby removing the solid pore forming material and forming aggregates.

8. A production method of a niobium or tantalum powder according to claim 7, wherein the solid pore forming material is made of at least one selected from the group consisting of magnesium, magnesium hydrides, calcium, calcium hydrides, and aluminum.

9. A production method of a niobium or tantalum powder comprising the steps of:
    adding a solid pore forming material having a thermal decomposition property or a thermal sublimation property and at least one shape selected from particle shape having a diameter in a range from 2 to 6 μm, film shape or foil shape having a thickness in a range from 1 to 20 μm, flake shape and fiber shape having a diameter in a range from 1 to 20 μm and a length in a range from 100 μm to 1 cm to primary particles of niobium or tantalum; and
    heat treating and thereby removing the solid pore forming material, and forming aggregates.

10. A production method of a niobium or tantalum powder according to claim 6, wherein the adding amount of the solid pore forming material relative to the niobium or tantalum powder is 3% by volume or greater.

11. A production method of a niobium or tantalum powder according to claim 7, wherein the adding amount of the solid pore forming material relative to the niobium or tantalum powder is 3% by volume or greater.

12. A niobium or tantalum porous molded product which has a pore ratio of 60% by volume or greater, pore distribution peaks measured by mercury porosimetry in a range from 0.08 to 0.5 μm, and a range from 1 to 20 μm, and comprises 5% by volume or greater of the pore having a size in a range from 1 to 20 μm relative to the total pore volume.

13. A niobium or tantalum porous sintered body which has a pore ratio of 60% by volume or greater, and comprises pore distribution peaks measured by mercury porosimetry in a range from 0.08 to 0.5 μm, and a range from 1 to 20 μm, and comprises 5% by volume or greater of the pore having a size in a range from 1 to 20 μm relative to the total pore volume.

14. A solid electrolytic capacitor comprising an anode electrode made of a niobium or tantalum porous sintered body according to claim 13.

15. A niobium or tantalum powder comprising aggregates in which primary particles of niobium or tantalum are aggregated, having a pore distribution having a peak in the range from 1 to 20 μm as measured by mercury porosimetry, and having an average particle diameter by the BET method of from 50 to 500 nm.

16. The niobium or tantalum powder according to claim 15, wherein said aggregates have a particle diameter of from about 38 to 250 μm.

17. A niobium or tantalum powder comprising aggregates in which primary particles of niobium or tantalum are aggregated, having a pore distribution having a peak in the range from 1 to 20 μm as measured by mercury porosimetry, wherein said pore distribution has two or more peaks, with each peak in said range.

18. The production method of a niobium or tantalum powder according to claim 9, wherein the solid pore forming material is made of at least one selected from the group consisting of magnesium, magnesium hydrides, calcium, calcium hydrides, and aluminum.

19. The production method of a niobium or tantalum powder according to claim 9, wherein the adding amount of the solid pore forming material relative to the niobium or tantalum powder is 3% by volume or greater.

* * * * *